(12) United States Patent
Ma et al.

(10) Patent No.: US 12,496,810 B2
(45) Date of Patent: Dec. 16, 2025

(54) LAMINATED GLASS AND A PROCESS FOR PREPARING THE SAME

(71) Applicant: SAINT-GOBAIN GLASS FRANCE, Courbevoie (FR)

(72) Inventors: Siteng Ma, Shanghai (CN); Chong Zhou, Shanghai (CN); Ce Shi, Shanghai (CN)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 79 days.

(21) Appl. No.: 18/547,524

(22) PCT Filed: Feb. 24, 2022

(86) PCT No.: PCT/CN2022/077574
§ 371 (c)(1),
(2) Date: Aug. 23, 2023

(87) PCT Pub. No.: WO2022/179541
PCT Pub. Date: Sep. 1, 2022

(65) Prior Publication Data
US 2024/0157682 A1    May 16, 2024

(30) Foreign Application Priority Data
Feb. 26, 2021   (CN) .......................... 202110217038.4

(51) Int. Cl.
*B32B 7/12*      (2006.01)
*B32B 17/10*     (2006.01)

(52) U.S. Cl.
CPC .. *B32B 17/10788* (2013.01); *B32B 17/10018* (2013.01); *B32B 17/10036* (2013.01); *B32B 17/10293* (2013.01); *B32B 17/10504* (2013.01); *B32B 17/10697* (2013.01); *B32B 17/10871* (2013.01); *B32B 7/12* (2013.01); *B32B 2250/03* (2013.01); *B32B 2250/04* (2013.01); *B32B 2250/05* (2013.01); *B32B 2250/40* (2013.01);
(Continued)

(58) Field of Classification Search
CPC ................ B32B 7/12; B32B 17/10036; B32B 17/10697; B32B 17/10788
See application file for complete search history.

(56) References Cited

FOREIGN PATENT DOCUMENTS

| CN | 1412861 A | 4/2003 |
|---|---|---|
| CN | 101454154 A | 6/2009 |

(Continued)

OTHER PUBLICATIONS

KR 2020/0078478 (Year: 2020).*
International Search Report as issued in International Patent Application No. PCT/CN2022/077574, dated May 23, 2022.

*Primary Examiner* — Elizabeth E Mulvaney
(74) *Attorney, Agent, or Firm* — Pillsbury Winthrop Shaw Pittman LLP

(57) ABSTRACT

A laminated glass, includes a glass plate, a polymer layer, and a functional device layer, wherein, the polymer layer is located between the glass plate and the functional device layer; the laminated glass further optionally includes another polymer layer, which is located at the other side of the functional device layer, opposite to the glass plate; the polymer layers each independently include polymer, which is selected from crosslinked ethylene-vinyl acetate copolymer, polyolefin thermoplastic elastomer, and thermoplastic polyurethane elastomer.

19 Claims, 6 Drawing Sheets

(52) U.S. Cl.
CPC ... *B32B 2307/412* (2013.01); *B32B 2307/732* (2013.01); *B32B 2309/02* (2013.01); *B32B 2309/12* (2013.01); *B32B 2315/08* (2013.01); *B32B 2323/04* (2013.01); *B32B 2331/04* (2013.01); *B32B 2457/20* (2013.01)

(56) References Cited

FOREIGN PATENT DOCUMENTS

| | | | |
|---|---|---|---|
| CN | 102630200 | A | 8/2012 |
| CN | 203048857 | U | 7/2013 |
| CN | 107351511 | A | 11/2017 |
| CN | 108215420 | A | 6/2018 |
| CN | 108472891 | A | 8/2018 |
| CN | 109588053 | A | 4/2019 |
| CN | 111868613 | A | 10/2020 |
| JP | H11-54766 | A | 2/1999 |
| JP | H11-54767 | A | 2/1999 |
| JP | 2000-183385 | A | 6/2000 |

\* cited by examiner ature film is ethylene vinyl acetate resin co-extruded hot-melt adhesive film, polyolefin elastomer coextruded hot-melt adhesive film or polyvinyl butyral resin coextruded hot-melt adhesive film.

LAMINATED GLASS AND A PROCESS FOR PREPARING THE SAME

CROSS-REFERENCE TO RELATED APPLICATIONS

This application is the U.S. National Stage of PCT/CN2022/077574, filed Feb. 24, 2022, which in turn claims priority to Chinese patent application number 202110217038.4 filed Feb. 26, 2021. The content of these applications are incorporated herein by reference in their entireties.

TECHNICAL FIELD

The present disclosure relates to the field of glass manufacturing, and in particular to a laminated glass comprising a polymer layer and a functional device layer and a process for preparing the same.

BACKGROUND

Smart glazings (also known as switchable glazings) have become popular in buildings and in vehicles. Generally, in the laminated glazing structure of a smart glazing, the laminated glass contains at least one glass layer sheet, wherein the glass layer sheet comprises a functional device or a membrane to provide an additional function for the laminated glass. The functional device includes but not limited to photochromic device, suspended particle device, liquid crystal device, etc.

CN101454154A discloses a laminated glazing comprising two plies of glass having an interlayer structure laminated therebetween, wherein, the interlayer structure comprises a first sheet of an interlayer material framing a suspended particle device film incorporated therein. The interlayer material is chosen to minimize the migration of the components of the interlayer material into the suspended particle device film.

CN102630200A discloses a laminated glazing comprising an SPD layer sheet including a suspended particle device having a low transmittance off-state and a high transmittance on-state, at least one interlayer sheet comprising an interlayer material, and at least one glazing layer sheet.

CN109588053A discloses a vehicle window pane, comprising, in the following order, a first glass pane, one or a plurality of polymer layers, a PDLC layer, including a polymer matrix in which liquid crystal droplets are embedded, wherein an electrically conductive layer is arranged in each case on both sides of the PDLC layer, or an SPD layer, including a polymer matrix in which suspension droplets are embedded, in which light-polarizing particles are suspended, wherein an electrically conductive layer is arranged in each case on both sides of the SPD layer, one or a plurality of polymer layers, and a second glass pane, wherein, in the case of the PDLC layer, the liquid crystal droplets or, in the case of the SPD layer, the suspension droplets have an average size of more than 2 μm, preferably with a relative standard deviation of more than 30%.

CN203048857U discloses a multi-layer co-extruded surface layer pre-crosslinked hot-melt adhesive film, comprising at least two layers of co-extruded hot-melt adhesive film. The co-extruded hot-melt adhesive film is ethylene vinyl acetate resin co-extruded hot-melt adhesive film, polyolefin elastomer coextruded hot-melt adhesive film or polyvinyl butyral resin coextruded hot-melt adhesive film.

It is desirable in the field to obtain smart glazing with good mechanical properties, safety performance, environmental resistance and optical properties.

SUMMARY

To address the problems in the field, provided is a laminated glass, which forms a polymer layer of the laminated glass with crosslinked ethylene-vinyl acetate copolymer, polyolefin thermoplastic elastomer or thermoplastic polyurethane elastomer.

In an aspect, provided is a laminated glass, comprising a (A) glass plate, a (B) polymer layer, and a (C) functional device layer, wherein, the (B) polymer layer is located between the (A) glass plate and the (C) functional device layer; the laminated glass further optionally comprises a (B') polymer layer, which is located at the other side of the (C) functional device layer, opposite to the (A) glass plate; the polymer layers each independently comprise a polymer, which is selected from the group consisting of crosslinked ethylene-vinyl acetate copolymer, polyolefin thermoplastic elastomer and thermoplastic polyurethane elastomer.

In an embodiment, the polymer is crosslinked ethylene-vinyl acetate copolymer, which has a crosslinking degree of about 50% or more, preferably about 80% or more, more preferably about 85% or more, particularly preferably completely crosslinked.

In another embodiment, the molar content percentage of the vinyl acetate in the crosslinked ethylene-vinyl acetate copolymer is about 5%-50%, preferably about 5%-40%.

In an embodiment, the polymer layer is free of plasticizer.

In a preferable embodiment, the laminated glass further comprises a (A') glass plate, which is located at the side of the laminated glass opposite to the (A) glass plate and is identical or different to the (A) glass plate.

In an embodiment, the laminated glass in the following order comprises a (A) glass plate, a (B) polymer layer, a (C) functional device layer, a (B') polymer layer, and a (A') glass plate, wherein the each of the components is as defined above.

In another aspect, provided is a process for preparing the laminated glass according to the present disclosure, comprising the following steps: (1) providing a glass plate, a polymer layer and a functional device layer; (2) setting the glass plate, polymer layer and functional device layer, successively; (3) subjecting the set glass plate, polymer layer and functional device layer to lamination.

In yet another aspect, provided is use of a crosslinked ethylene-vinyl acetate copolymer in the preparation of a laminated glass.

BRIEF DESCRIPTION OF THE DRAWINGS

The foregoing and other aspects of the present application can be more fully understood from the detailed description described below in combination with the following drawings. It should be noted that the scales of the figures may be different for the purpose of clarity, but this does not affect the understanding of the present application.

Figure 1:
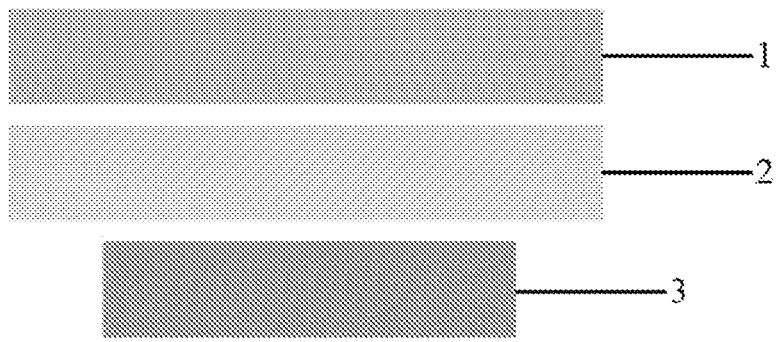
FIG. 1 shows a structural schematic diagram of the laminated glass according to the present disclosure.

wherein the reference numerals are as follows:

1. (A) glass plate; 2. (B) polymer layer; 3. (C) functional device layer; 4. (B') polymer layer; 5. (A') glass plate; 6. polymer frame; 7. glass plate (Model: VG10+LowE); 8. crosslinked ethylene-vinyl acetate copolymer; 9. crosslinked ethylene-vinyl acetate copolymer; 10. polymer dispersed liquid crystal (PDLC); 11. crosslinked ethylene-vinyl acetate copolymer; 12. crosslinked ethylene-vinyl acetate copolymer; 13. glass plate (Model: PLC); 14. glass plate (Model: PLC); 15. crosslinked ethylene-vinyl acetate copolymer; 16. polymer dispersed liquid crystal (PDLC); 17. crosslinked ethylene-vinyl acetate copolymer; 18. glass plate (Model: PLC).

DETAILED DESCRIPTION

General Definition and Terms

The present disclosure will be described in details below, and it should be noted that the description is provided for the purposed of illustration rather than limitation.

Unless otherwise stated, the technical and scientific terms used herein have the same meaning as commonly understood by a person skilled in the art. If there is a contradiction, the definition provided in this application shall prevail. When expressing a certain amount, concentration or other value or parameter in the form of a range, a preferable range, or a preferable range upper limit and a preferable range lower limit, it should be understood that it corresponds to specifically revealing any range by combining any pair of upper limit of the range or preferable range value with the lower limit of any range or preferable range value, regardless of whether the range is specifically disclosed. Unless otherwise stated, the numerical ranges listed herein are intended to include the endpoints of the range and all integers and fractions (decimals) within the range.

When used with a numerical variable, the term "approximate" or "about" usually refers to the value of the variable and all the values of the variable within the experimental error (for example, within an average 95% confidence interval) or within ±10% of the specified value, or a wider range.

The term "optional" or "optionally" means the event described subsequent thereto may or may not happen. This term encompasses the cases that the event may or may not happen, and that the contents are selected in an arbitrary manner.

Unless otherwise stated, the percentages, parts or the like herein are on a weight basis.

The expression "comprise" or its synonyms "contain", "include", "have" or the like are meant to be inclusive, which does not exclude other unlisted elements, steps or ingredients. The expression "consist of" excludes any unlisted elements, steps or ingredients. The expression "substantially consist of" refers to specified elements, steps or ingredients within a given range, together with optional elements, steps or components which do not substantively affect the basic and novel feature of the claimed subject matter. It should be understood that the expression "comprise" encompasses the expressions "substantially consist of" and "consist of".

The term "one or more" or "at least one" as used herein means one, two, three, four, five, six, seven, eight, nine or more.

Unless otherwise stated, the terms "a combination thereof" and "a mixture thereof" refer to a multi-component mixture of the elements, such as two, three, four and up to the maximum possible multi-component mixture.

The term "selected from" as used herein refers to one or more elements of the group listed thereafter, selected independently, and may encompass the combination of two or more elements.

When numerical values or range endpoints are described herein, it should be understood that the disclosure includes the particular value or endpoint recited.

"Optional" or "optionally" as used herein means that the subsequently described event or circumstance may or may not occur, and that the description includes instances where the event or circumstance occurs and instances where it does not.

As used herein, the term "laminated glass" refers to a composite glass product, where a side of the glass may contain one or more layers of organic polymer film. The laminated glass is usually prepared by high temperature precompression (or vacuum condition) and high temperature and high pressure process.

As used herein, the term "functional module" refers to a component containing an electronic element that can provide electric or photoelectric function. The exemplary functional device comprises but not limited to polymer dispersed liquid crystal (PDLC), suspended particle device (SPD), electrochromic (EC) display device, guest host liquid crystal (GHLC) display device, lighting device (including visible light and invisible light, e.g., ultraviolet light or infrared light), wireless communication device, electronic device, sensing device, antenna, touch control module or other HMI (human machine interface) related module.

As used herein, the term "functional device layer" refers to a layer containing a functional module, that is, a layer containing a component of an electronic element.

As used herein, the term "crosslinking degree" refers to the proportion of repeating unit with crosslinked structure in the crosslinked polymer. The crosslinking degree of crosslinked ethylene-vinyl acetate copolymer herein refers to the proportion of ethylene-vinyl acetate repeating unit in the crosslinked ethylene-vinyl acetate copolymer containing the crosslinked structure.

As used herein, the term "lamination" refers to the process of lamination to make the layers fit together under a certain temperature and pressure after the layers of the laminated glass are set.

As used herein, the term "transmittance" refers to the ability of light to transmit through a medium, which is the percentage of luminous flux passing through a transparent or translucent body to its incident luminous flux. The transmittance can be measured, for example, using a spectrophotometer, such as Lambda 950 Spectrophotometer Photometer of PE company. The measurement temperature is for example room temperature. The wavelength range of transmittance measured herein is 380-780 nm.

As used herein, the term "ITO film" refers to a conductive film with the main component of indium tin oxide, which is commonly used in liquid crystal display, solar cell and other fields.

As used herein, the term "room temperature" refers to about 20-30° C., such as about 25° C.

Laminated Glass

Provided is a laminated glass, comprising
a (A) glass plate,
a (B) polymer layer, and
a (C) functional device layer,
wherein,
the (B) polymer layer is located between the (A) glass plate and the (C) functional device layer;
the laminated glass further optionally comprises a (B') polymer layer, which is located at the other side of the (C) functional device layer, opposite to the (A) glass plate;
the (B) polymer layer and the (B') polymer layer each independently comprise a polymer, which is selected from the group consisting of crosslinked ethylene-vinyl acetate copolymer (EVA), polyolefin thermoplastic elastomer (POE) and thermoplastic polyurethane elastomer (TPU).

Glass Plate

The glass plate herein is an amorphous inorganic non-metallic material, typically made from various inorganic minerals (e.g., quartz sand, borax, boric acid, barite, barium carbonate, limestone, feldspar, sodium carbonate, etc.) as the main raw materials and a small amount of auxiliary raw materials, and its main components are silicon dioxide and other oxides. The "glass" herein may be any type of glass, for example ordinary glass, whose chemical composition comprises $Na_2SiO_3$, $CaSiO_3$, $SiO_2$ or $Na_2O \cdot CaO \cdot 6SiO_2$, etc., such as silicate double salt which is an amorphous solid with an irregular structure. As another example, it can be colorless glass, and it can also be colored glass into which certain metal oxides or salts are mixed to exhibit colors, or tempered glass obtained by a physical or chemical method. In addition, the "glass" herein can also be other types of glass, such as coloured glass, tempered glass, insulating glass, coated glass, etc. In the present disclosure, the glass plate can be, for example, a glass of Saint-Gobain model PLC and VG10+LowE glass.

The shape of the glass plate herein can be any shape. According to actual requirement, the glass plate can be square, rectangle, circle, oval shape, regular hexagon, etc. In addition, for example, the glass plate can also be a frame of any shape, that is, the interior of the glass plate plane is hollow, and the outside is a glass plate. According to actual requirement, the position, shape and size of the hollow structure can also be arbitrary. For example, the glass plate has a square frame, where the hollow structure is square, which is located in the center of the glass plate plane.

In the present disclosure, according to actual requirement, the surface of the glass plate can be horizontal and flat, or with any radian, or with an irregular radian. In addition, when the laminated glass contains two or more glass plates and the glass plates have a radian, the radial orientation of each glass plate can be identical or different.

In the present disclosure, when the laminated glass contains two or more glass plates, the materials of the glass plates can be identical or different. For example, the laminated glass comprises two glass plates, wherein both of the glass plates use Saint-Gobain model PLC glass. As another example, the laminated glass comprises two glass plates, one of them uses Saint-Gobain model PLC glass, and the other uses Saint-Gobain model VG10+LowE glass.

In an embodiment, the laminated glass according to the present disclosure comprises a (A) glass plate. In a preferable embodiment, the laminated glass according to the present disclosure comprises a (A) glass plate and a (A') glass plate, wherein the (A') glass plate is located at the side of the laminated glass opposite to the (A) glass plate, and its material is identical or different to the (A) glass plate.

In the present disclosure, when the laminated glass comprises two or more glass plates, the thickness of the glass plates can be identical or different. In an embodiment, the glass plate has a thickness of about 1.5-3 mm. In a preferable embodiment, the glass plate has a thickness of about 2.0-2.5 mm. For example, about 1.5 mm, about 1.6 mm, about 1.7 mm, about 1.8 mm, about 1.9 mm, about 2.0 mm, about 2.1 mm, about 2.2 mm, about 2.3 mm, about 2.4 mm, about 2.5 mm, about 2.6 mm, about 2.7 mm, about 2.8 mm, about 2.9 mm, about 3 mm. An appropriate glass plate thickness is beneficial for better mechanical strength and transmittance of the laminated glass. An overly high glass plate thickness will affect the transmittance of the laminated glass. An overly low glass plate thickness will affect the overall mechanical strength of the laminated glass.

Polymer Layer

In the present disclosure, the polymer layer refers to a film containing a polymer matrix, and the polymer layer is disposed on a side of the glass plate.

In the present disclosure, the polymer in the polymer layer is selected according to the requirement of the properties of the laminated glass, the requirement of the production conditions of the laminated glass and the properties of the functional device layer. Specifically, the selection of the polymer should meet the following:
(1) the polymer used can make the laminated glass pass the following test standard:
 (a) ECE R43 standard (ECE Regulation NO. 43);
 (b) GB9656 standard;
 (c) GBT5137 standard;
 (d) ANSI/SAE Z26.1 (American National Standard for Safety Glazing Materials for Glazing Motor Vehicles and Motor Vehicle Equipment Operating on Land Highways-Safety Standard) standard.
(2) the polymer used can make the preparation process of the laminated glass satisfy the following:
 (a) the temperature in the laminated glass lamination process is 135° C. or lower;
 (b) the pressure in the laminated glass lamination process is 13 bar or lower.

In an embodiment, the polymer layer comprises a polymer, wherein the polymer is selected from the group consisting of crosslinked ethylene-vinyl acetate copolymer, polyolefin thermoplastic elastomer and thermoplastic polyurethane elastomer. In a preferable embodiment, the polymer layer comprises a polymer, wherein the polymer is crosslinked ethylene-vinyl acetate copolymer.

In the prior art, when PVB (polyvinyl butyral) is used as the polymer layer of the laminated glass, it is necessary to use PET (polyethylene terephthalate) tape to seal the edge of the PDLC, thereby avoiding direct contact between the PDLC and PVB. In the present disclosure, the polymer used is selected from the group consisting of crosslinked ethylene-vinyl acetate copolymer, polyolefin thermoplastic elastomer and thermoplastic polyurethane elastomer, which can be in direct contact with the PDLC layer without affecting the function of the PDLC layer, thus eliminating the need for the step of edge sealing with PET tape.

Crosslinked Ethylene-Vinyl Acetate Copolymer

The crosslinked ethylene-vinyl acetate copolymer (EVA) refers to an ethylene-vinyl acetate copolymer with a crosslinked structure.

Under certain conditions (such as light, etc.), a free radical initiator (such as peroxide) is added to the ethylene-vinyl acetate copolymer containing a linear structure, and the ethylene-vinyl acetate copolymer is subjected to a free radical reaction to obtain the ethylene-vinyl acetate copolymer containing crosslinked structure. Using the crosslinked ethylene-vinyl acetate copolymer, the obtained laminated glass according to the present disclosure can meet the test standard as described above. In addition, the preparation conditions of the laminated glass can also meet the above conditions.

According to actual requirement, the crosslinked ethylene-vinyl acetate copolymer with different crosslinking degrees can be used. In an embodiment, the crosslinked ethylene-vinyl acetate copolymer has a crosslinking degree of about 50% or more. In a preferable embodiment, the crosslinked ethylene-vinyl acetate copolymer has a crosslinking degree of about 70% or more. In a preferable embodiment, the crosslinked ethylene-vinyl acetate copolymer has a crosslinking degree of about 80% or more. In a preferable embodiment, the crosslinked ethylene-vinyl acetate copolymer has a crosslinking degree of about 85% or more. In a preferable embodiment, the crosslinked ethylene-vinyl acetate copolymer has a crosslinking degree of about 90% or more. In a more preferable embodiment, the crosslinked ethylene-vinyl acetate copolymer is completely crosslinked. For example, the crosslinked ethylene-vinyl acetate copolymer can have a crosslinking degree of about 80%, about 85%, about 90%, about 95% or about 100%. An appropriate crosslinking degree can make the ethylene-vinyl acetate copolymer obtain better mechanical properties, which is beneficial for the combination with the glass plate and the functional device layer.

In the present disclosure, the crosslinking degree is tested by xylene extraction or differential scanning calorimetry (DSC method) provided in "Ethylene-vinyl acetate copolymer (EVA) gel film for photovoltaic module encapsulation" (T/CPIA 0004-2017).

The ethylene-vinyl acetate copolymer comprises the repeating unit of

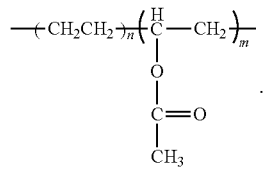

The ethylene-vinyl acetate copolymer exhibits different properties depending on the vinyl acetate content in the copolymer. For example, when the vinyl acetate content is low, the acetic acid in the ethylene-vinyl acetate copolymer has a certain degree of crystallinity. As another example, when the molar content percentage of the vinyl acetate is 10%-20%, the acetic acid in the ethylene-vinyl acetate copolymer exhibits plastic properties. As another example, when the molar content percentage of the vinyl acetate exceeds 30%, the ethylene-vinyl acetate copolymer exhibits elasticity properties. In an embodiment, the molar content percentage of the vinyl acetate in the crosslinked ethylene-vinyl acetate copolymer is about 5%-50%. In a preferable embodiment, the molar content percentage of the vinyl acetate in the crosslinked ethylene-vinyl acetate copolymer is about 5%-40%. For example, about 5%, about 10%, about 15%, about 20%, about 25%, about 30%, about 35%, about 40%, about 45%, about 50%.

In an embodiment, the crosslinked ethylene-vinyl acetate copolymer has the structure of following Formula (I):

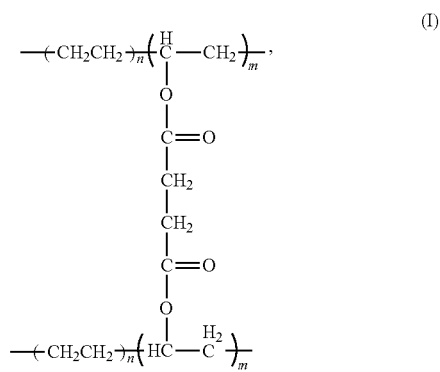

wherein, m and n are each independently an integer selected from the group consisting of 1-30. In a preferable embodiment, m and n are each independently an integer selected from the group consisting of 1-20. For example, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30.

The laminated glass according to the present disclosure by using the crosslinked ethylene-vinyl acetate copolymer has high mechanical strength together with high toughness, high temperature resistance, humidity resistance and transmittance.

In the present disclosure, the plasticizer is a kind of organic compound, which can be added to a polymer to facilitate the processing of the polymer, and to modify (solvate) the interior of the polymer molecule, thereby improving the flexibility and toughness of the polymer. The plasticizer easily reacts with the functional module, such as polymer dispersed liquid crystal, suspended particle device, etc., and affects the function of the functional module. In a preferable embodiment, the polymer layer is free of plasticizer.

The Laminated Glass Comprising Multiple Polymer Layers

In an embodiment, the laminated glass according to the present disclosure comprises a (B) polymer layer. In a preferable embodiment, the laminated glass according to the present disclosure comprises a (B) polymer layer and a (B') polymer layer.

In an embodiment, the (B) polymer layer and the (B') polymer layer each independently comprise a polymer, which is selected from the group consisting of: crosslinked ethylene-vinyl acetate copolymer, polyolefin thermoplastic elastomer and thermoplastic polyurethane elastomer.

The polymers contained in the (B) polymer layer and the (B') polymer layer can be identical or different. For example, the (B) polymer layer can comprise crosslinked ethylene-vinyl acetate copolymer, the (B') polymer layer can comprise polyolefin thermoplastic elastomer. As another example, the (B) polymer layer can comprise crosslinked ethylene-vinyl acetate copolymer, the (B') polymer layer can comprise ethylene-vinyl acetate copolymer. As another example, the (B) polymer layer can comprise polyolefin thermoplastic elastomer and thermoplastic polyurethane elastomer, the (B') polymer layer can comprise ethylene-vinyl acetate copolymer.

The (B) polymer layer and the (B') polymer layer can each independently comprise polymers of one type or they can comprise 2 or more types of polymers. For example, the (B) polymer layer and the (B') polymer layer can comprise crosslinked ethylene-vinyl acetate copolymer. As another example, the (B) polymer layer and the (B') polymer layer can comprise polyolefin thermoplastic elastomer. As another example, the (B) polymer layer and the (B') polymer layer can comprise crosslinked ethylene-vinyl acetate copolymer and polyolefin thermoplastic elastomer, where there is no particular limitation to the ratios and forms of the above two polymers.

Shape of the Polymer Layer

In the present disclosure, the shape of the polymer layer can be arbitrary. According to actual requirement, the polymer layer can be square, rectangle, circle, oval shape, regular hexagon, etc. In addition, the polymer layer can also be a frame of any shape, that is, the interior of the polymer layer is hollow, and the polymer forms a frame-like structure around the hollow portion. According to actual requirement, the position, shape and size of the hollow structure can also be arbitrary. For example, the polymer layer is a frame of square, where the hollow structure is square, located in the center of the polymer layer.

In the present disclosure, according to actual requirement, the surface of the polymer layer can be horizontal and flat, and can also have any radian, or can have an irregular radian. In addition, when the laminated glass comprises two or more polymer layers and the polymer layers have a radian, the radian orientations of each of the polymer layers can be identical or different.

In a preferable embodiment, the shape and size of the polymer layer are identical to those of the glass plate.

Thickness of the Polymer Layer

In the present disclosure, when the laminated glass comprises two or more polymer layers, the thickness of the polymer layers can be identical or different. In an embodiment, the polymer layer has a thickness of about 0.3-0.5 mm. In a preferable embodiment, the polymer layer has a thickness of about 0.35-0.45 mm. For example, about 0.3 mm, about 0.31 mm, about 0.32 mm, about 0.33 mm, about 0.34 mm, about 0.35 mm, about 0.36 mm, about 0.37 mm, about 0.38 mm, about 0.39 mm, about 0.4 mm, about 0.41 mm, about 0.42 mm, about 0.43 mm, about 0.44 mm, about 0.45 mm, about 0.46 mm, about 0.47 mm, about 0.48 mm, about 0.49 mm, about 0.5 mm. Appropriate thickness of the polymer layer is beneficial for obtaining the laminated glass with better properties. An overly high thickness of the polymer layer will affect the transmittance of laminated glass. An overly low thickness of the polymer layer is adverse to the mechanical strength of the laminated glass.

Polymer Layer with Multilayer Structure

In a preferable embodiment, in the laminated glass according to the present disclosure, the polymer layer comprises one or more layers, each of the layers each independently comprises a polymer, which is selected from the group consisting of crosslinked ethylene-vinyl acetate copolymer, polyolefin thermoplastic elastomer, thermoplastic polyurethane elastomer.

In a more preferable embodiment, the polymer in the one or more layers is crosslinked ethylene-vinyl acetate copolymer.

In a preferable embodiment, the polymer in the one or more layers is crosslinked ethylene-vinyl acetate copolymer, the crosslinked ethylene-vinyl acetate copolymer has a crosslinking degree of about 50% or more. In a more preferable embodiment, the crosslinked ethylene-vinyl acetate copolymer has a crosslinking degree of about 70% or more. In a more preferable embodiment, the crosslinked ethylene-vinyl acetate copolymer has a crosslinking degree of about 80% or more. In a more preferable embodiment, the crosslinked ethylene-vinyl acetate copolymer has a crosslinking degree of about 85% or more. In a more preferable embodiment, the crosslinked ethylene-vinyl acetate copolymer has a crosslinking degree of about 90% or more. In a particularly preferable embodiment, the crosslinked ethylene-vinyl acetate copolymer is completely crosslinked. For example, the ethylene-vinyl acetate copolymer has a crosslinking degree, which can be about 80%, about 85%, about 90%, about 95%, about 100%.

In another preferable embodiment, the polymer in the one or more layers is crosslinked ethylene-vinyl acetate copolymer, the molar content percentage of the vinyl acetate in the crosslinked ethylene-vinyl acetate copolymer is about 5%-50%. In a more preferable embodiment, the molar content percentage of the vinyl acetate in the crosslinked ethylene-vinyl acetate copolymer is about 5%-40%. For example, about 5%, about 10%, about 15%, about 20%, about 25%, about 30%, about 35%, about 40%.

In yet another preferable embodiment, the polymer in the one or more layers is crosslinked ethylene-vinyl acetate copolymer, wherein the crosslinked ethylene-vinyl acetate copolymer has the structure shown in the above formula (I).

In the present disclosure, when the polymer layer comprises one or more layers, the layers may be two or more. In a preferred embodiment, the polymer layer comprises two layers.

In the present disclosure, the shape of one or more layers in the polymer layer can be arbitrary. According to actual requirement, the one or more layers can be square, rectangle, circle, oval shape, regular hexagon, etc. In addition, the one or more layers can also be a frame of any shape, that is, the interior of the layer plane is hollow, and the exterior is polymer. According to actual requirement, the position, shape and size of the hollow structure can also be arbitrary. For example, the one or more layers are square frames, where the hollow structure is square and is located at the center of the layer plane.

In the present disclosure, according to actual requirement, the surfaces of one or more layers in the polymer layer can be horizontal and flat, and can also have any radian, or can have an irregular radian. In addition, when the laminated glass comprises two or more polymer layers and the polymer layers have a radian, the radian orientations of each of the polymer layers can be identical or different.

In a preferable embodiment, the shape and size of the one or more layers in the polymer layer are identical to those of the glass plate.

In the present disclosure, when the polymer layer comprises one or more layers, the thickness of each of the layers can be identical or different, and the sum of the thickness of each of the layers is the thickness of the polymer layer.

Figure 7:
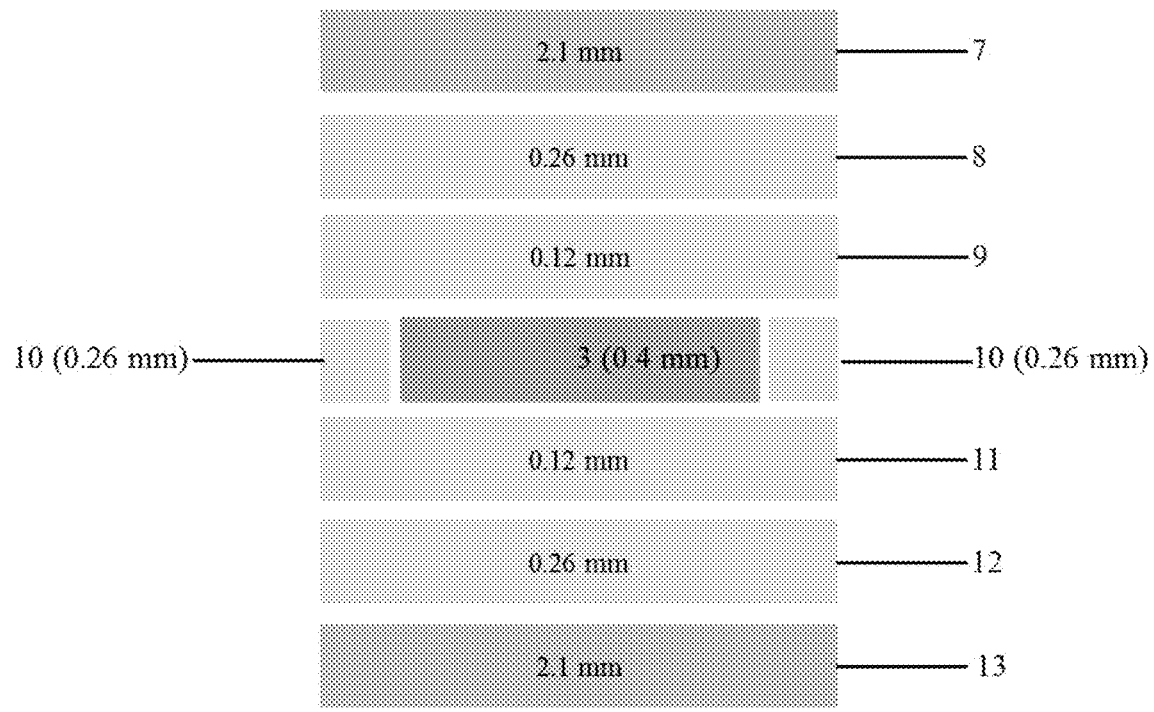
FIG. 7 shows a structural schematic diagram of the laminated glass according to the present disclosure.

In a preferable embodiment, in the laminated glass according to the present disclosure, the polymer layer comprises a (B) polymer layer and a (B') polymer layer, and the (B) polymer layer and the (B') polymer layer each independently comprise two layers. FIG. 7 shows the laminated glass according to the present disclosure, wherein the laminated glass comprises two polymer layers, i.e., two polymer layers comprising crosslinked ethylene-vinyl acetate copolymer in the figure. In addition, the above two polymer layers each independently comprise two layers, and the thickness of the layers are different.

Functional Device Layer

In the present disclosure, the functional device layer refers to the layer containing a functional module in the laminated glass, wherein the functional device layer can provide electrical or optoelectronic function for the laminated glass according to the present disclosure.

In an embodiment, the functional device layer comprises a functional module selected from the group consisting of: polymer dispersed liquid crystal (PDLC), suspended particle device (SPD), electrochromic (EC) display device, guest host liquid crystal (GHLC) display device, lighting device (including visible light and invisible light, e.g., ultraviolet light or infrared light), wireless communication device, electronic device, sensing device, antenna, touch control module or other HMI (human machine interface) related module.

Polymer Dispersed Liquid Crystal

The Polymer Dispersed Liquid Crystals (PDLC) refer to liquid crystals dispersed in the organic solid polymer matrix as micron-scale small droplets. Since the optical axis of the small droplets composed of liquid crystal molecules has a free orientation, its refractive index does not match the refractive index of the substrate, and when the light passes through the substrate, it is strongly scattered by the droplet and shows an opaque opalescent or translucent state. The optical axis orientation of the liquid crystal droplets can be adjusted by applying an electric field to the polymer dispersed liquid crystals, and when the two refractive indices match, a transparent state is presented. When the electric field is removed, the liquid crystal droplets return to the original astigmatism state. Therefore, the glass comprising polymer dispersed liquid crystals can switch between transparent and opaque modes.

Suspended Particle Device

The suspended particle devices refer to suspended particles comprised in the liquid suspension medium contained in the polymer. Similar to the polymer dispersed liquid crystals, suspended particle devices can generally be switched between a dark state (no voltage is applied) and a highly transparent state (a voltage is applied). The relative alignment between particles in the suspended particle device is usually determined by the applied voltage, which makes the suspended particle device exhibit variable optical transmittance when a variable voltage is applied.

Electrochromic Display Device

The electrochromism refers to a phenomenon that the optical properties (reflectivity, transmittance, absorptance, etc.) of a material undergo stable and reversible color changes under the action of an external electric field, which manifests as reversible changes in color and transparency in appearance. The material comprising electrochromic properties is known as an electrochromic material, and the display device prepared using the electrochromic material is an electrochromic display device.

Guest Host Liquid Crystal Display Device

The guest host liquid crystal display device refers to a liquid crystal display device formed by dissolving dichroic dyes (object) in a certain oriented liquid crystal (host). The dyes can absorb different wavelengths of visible light, such that the liquid crystal device presents different colors, thereby realizing colouring display. Usually, the dichroic dyes have anisotropic absorption of the visible light along the long and short axes of the molecule, such that the dyes have two states of absorption and non-absorption in the utilization of the device. The molecules are aligned with the parallel orientation of the liquid crystal molecules, and after being subjected to the action of the field, the dye molecules change with the change of the orientation of the liquid crystal molecules, such that the absorption of the visible light by the dye also changes.

HMI Related Module

The HMI (Human Machine Interface) refers to the human machine interface, which is a medium for interaction and information exchange between the system and users, which can realize the conversion between the interior form of information and the form acceptable to humans.

In a preferable embodiment, in the laminated glass according to the present disclosure, the functional module comprised in the functional device layer is polymer dispersed liquid crystal.

Shape of the Functional Device Layer

In the present disclosure, the shape of the functional device layer can be arbitrary. According to actual requirement, the functional device layer can be square, rectangle, circle, oval shape, regular hexagon, etc. In addition, according to actual requirement, for example, the functional device layer can be a frame of any shape, that is, the interior of the functional device layer plane is hollow, and the exterior is the functional device. According to the requirement of the functional module, the position, shape and size of the hollow structure can also be arbitrary. For example, the functional module is a frame of square, and the hollow structure is square, located in the center of the functional module plane.

In the present disclosure, according to actual requirement, the surface of the functional device layer can be horizontal and flat, and can also have any radian, or can have an irregular radian.

In a preferable embodiment, the shape of the polymer layer and the glass plate are identical to those of the functional device layer.

In another preferable embodiment, the polymer layer and glass plate have sizes larger than that of the functional device layer.

Size of the Functional Device Layer

In an embodiment, the functional device layer has a thickness of about 0.3-0.5 mm. In a preferable embodiment, the functional device layer has a thickness of about 0.35-0.45 mm. For example, about 0.3 mm, about 0.31 mm, about 0.32 mm, about 0.33 mm, about 0.34 mm, about 0.35 mm, about 0.36 mm, about 0.37 mm, about 0.38 mm, about 0.39 mm, about 0.4 mm, about 0.41 mm, about 0.42 mm, about 0.43 mm, about 0.44 mm, about 0.45 mm, about 0.46 mm, about 0.47 mm, about 0.48 mm, about 0.49 mm, about 0.5 mm. An appropriate functional device layer thickness is beneficial for the functioning of the functional device. An overly high functional device layer thickness will affect the stability of the laminated glass, and when the laminated glass is subjected to heavy pressure, it is easy to cause the rupture of the laminated glass. An overly low functional device layer thickness is adverse to the function of the functional device.

Settings of the Laminated Glass

In the present disclosure, the (A) glass plate, (B) polymer layer and (C) functional device layer are set according to a specific positional relationship, wherein the (B) polymer layer in the laminated glass is located between the (A) glass plate and the (C) functional device layer. FIG. 1 shows the structure of the laminated glass according to the present disclosure, wherein the (A) glass plate, (B) polymer layer and (C) functional device layer are successively set, and the (B) polymer layer in the laminated glass is located in between the (A) glass plate and the (C) functional device layer.

Figure 2:
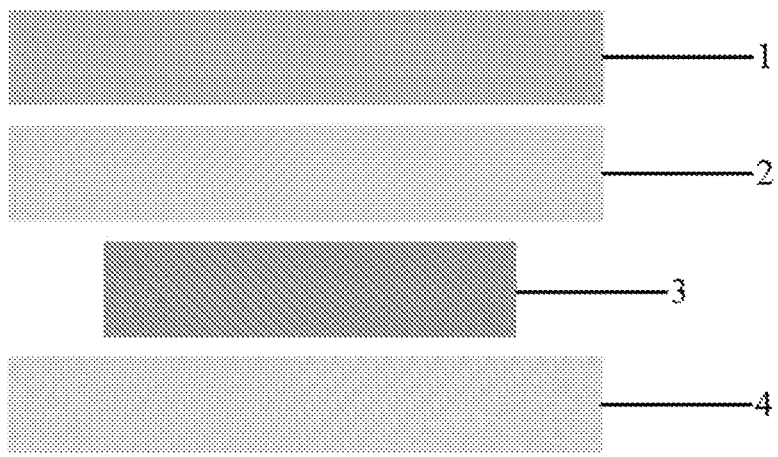
FIG. 2 shows a structural schematic diagram of the laminated glass according to the present disclosure.

Optionally, the laminated glass further comprises a (B') polymer layer, which is located at the other side of the (C) functional device layer, opposite to the (A) glass plate. FIG. 2 shows the structure of the laminated glass according to the present disclosure, wherein the (A) glass plate, (B) polymer layer, (C) functional device layer and (B') polymer layer are successively set, the (B) polymer layer is located between the (A) glass plate and the (C) functional device layer, the (B') polymer layer is located at the other side of the (C) functional device layer, opposite to the (A) glass plate.

Figure 3:
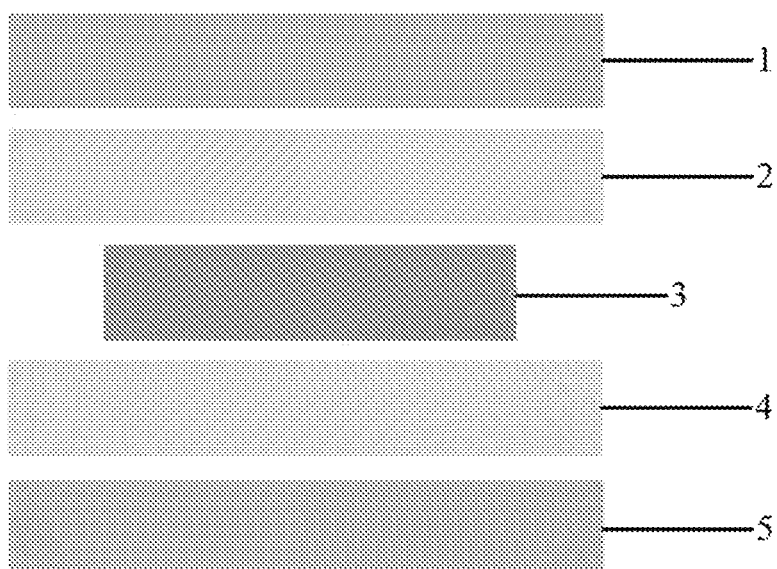
FIG. 3 shows a structural schematic diagram of the laminated glass according to the present disclosure.

In a preferable embodiment, the laminated glass further comprises a (B') polymer layer and a (A') glass plate, wherein the (B') polymer layer is located at the other side of the (C) functional device layer, opposite to the (A) glass plate, and the (B') polymer layer is located between the (C) functional device layer and the (A') glass plate, that is, the (A) glass plate, (B) polymer layer, (C) functional device layer, (B') polymer layer and (A') glass plate are successively set. FIG. 3 shows the structure of the laminated glass according to the present disclosure, wherein the (A) glass plate, (B) polymer layer, (C) functional device layer, (B') polymer layer and (A') glass plate are successively set.

In the present disclosure, according to actual requirement, the functional device layers of different shapes or sizes are used, and therefore the size of the functional device layer can be identical to those of the polymer layer and glass plate or can be smaller than those of the polymer layer and glass plate.

Figure 4:
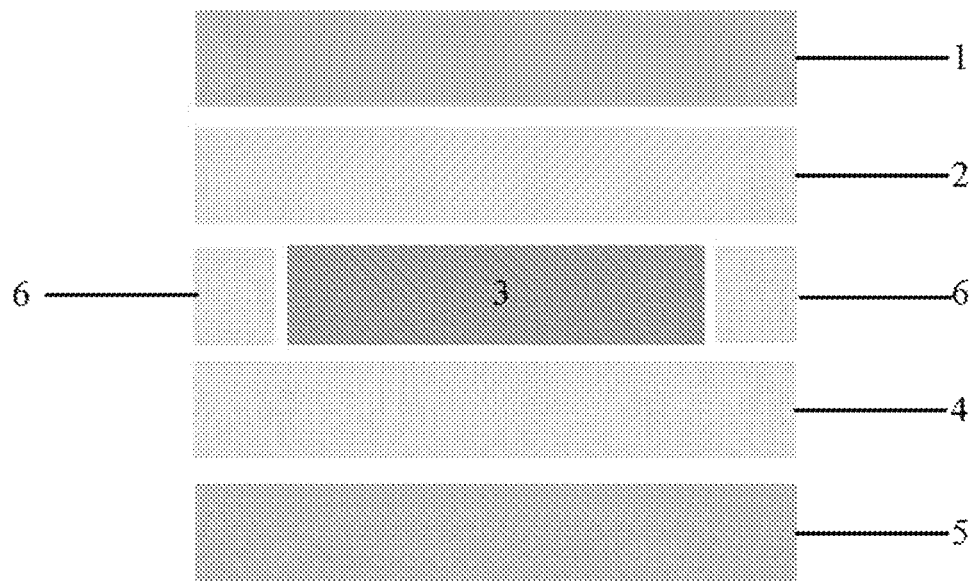
FIG. 4 shows a structural schematic diagram of the laminated glass according to the present disclosure.

In an embodiment, the area of the functional module of the functional device layer is less than that of the polymer layer, and there is an additional polymer around the functional module, and the additional polymer forms a continuous or discontinuous frame around, so as to surround and contain the functional module of the functional device layer. For example, FIG. 4 shows the laminated glass according to the present disclosure, wherein the (A) glass plate, (B) polymer layer, (C) functional device layer, (B') polymer layer and (A') glass plate are successively set, and the area of the functional module of the (C) functional device layer is less than those of the (B) polymer layer and the (B') polymer layer, and there is an additional polymer around the functional module of (C) functional device layer, and the additional polymer forms a frame around, so as to surround and contain the functional module. When the size of the functional device layer is smaller than those of the polymer layer and the glass plate, the setting of the polymer frame can fill the space between the edge of the functional module and the edge of the glass plate, preventing the glass plate from possible damage by the functional module, upon application of pressure on the glass plate during the preparation of the laminated glass.

Figure 11:
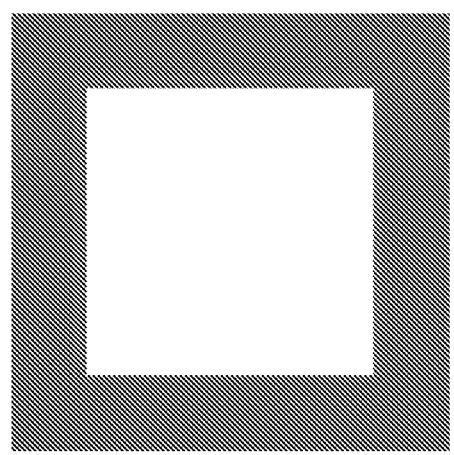
FIG. 11 shows an exemplary polymer frame according to the present disclosure.
Figure 12:
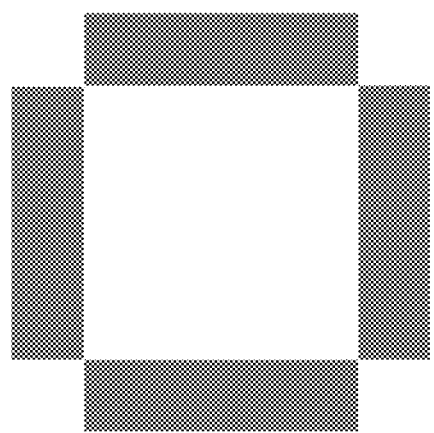
FIG. 12 shows an exemplary polymer frame according to the present disclosure.

In the present disclosure, "continuous or discontinuous" means that the shape of the frame formed by the additionally comprised polymer is continuous and complete, or discontinuous, as long as the frame formed by the additionally comprised polymer can surround and contain the functional module. For example, FIG. 11 shows an exemplary frame formed by the polymer, wherein the blank part of the frame is square, the shape of the frame is continuous and complete, and the frame formed by the polymer is continuous. As another example, FIG. 12 shows another exemplary frame formed by the polymer, wherein the blank part of the frame is square, and the four corners of the frame are also blank, where the frame formed by the polymer is discontinuous.

In the present disclosure, the shape and size of the frame formed by the polymer can be adjusted according to the shape and size of the functional module used, which are as described above.

Figure 5:
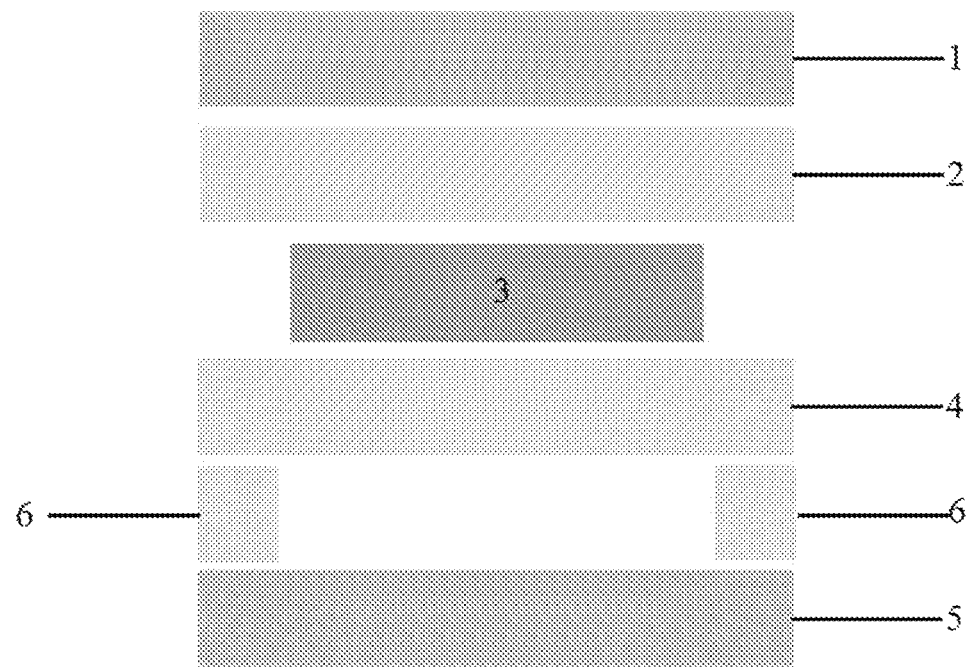
FIG. 5 shows a structural schematic diagram of the laminated glass according to the present disclosure.

In an embodiment, a polymer is further comprised between the (A) glass plate and the (B) polymer and/or between the (A') glass plate and the (B') polymer, and the polymer forms a continuous or discontinuous frame, which can surround and contain the functional module of the functional device layer. For example, FIG. 5 shows the laminated glass according to the present disclosure, wherein the (A) glass plate, (B) polymer layer, (C) functional device layer, (B') polymer layer and (A') glass plate are successively set, and the area of the (C) functional device layer is less than those of the (B) polymer layer and the (B') polymer layer, a polymer is further comprised between the (A') glass plate and the (B') polymer, and the polymer forms a frame, wherein the size of the blank part of the frame can surround and contain the functional module of the (C) functional device layer.

In an embodiment, the frame formed by the additional polymer has a thickness of about 0.2-0.4 mm. In a preferable embodiment, the frame formed by the additional polymer has a thickness of about 0.25-0.35 mm. For example, about 0.2 mm, about 0.21 mm, about 0.22 mm, about 0.23 mm, about 0.24 mm, about 0.25 mm, about 0.26 mm, about 0.27 mm, about 0.28 mm, about 0.29 mm, about 0.3 mm, about 0.31 mm, about 0.32 mm, about 0.33 mm, about 0.34 mm, about 0.35 mm, about 0.36 mm, about 0.37 mm, about 0.38 mm, about 0.39 mm, about 0.4 mm. An appropriate polymer frame thickness is beneficial for improving the stability of the laminated glass, effectively filling the space between the edge of the functional module and the edge of the glass plate and preventing the glass plate from possible damage by the functional module, upon application of pressure on the glass plate during the preparation of the laminated glass. An overly high polymer frame thickness will cause the polymer overflow, and may even block the functional module, affecting the functioning of the functional module. An overly low polymer frame thickness cannot effectively fill the space between the edge of the functional module and the edge of the glass plate.

Properties of the Laminated Glass

The properties of the laminated glass according to the present disclosure can be detected by the following methods.

The mechanical property, optical property and stability of the laminated glass according to the present disclosure can be measured by conventional means in the art. For example, the mechanical strength of the laminated glass can be determined by the falling ball test, using the method of ECE R43 standard A7/4. The toughness and mechanical strength of the laminated glass can be determined by the human head model experiment, using the method of ECE R43 standard A7/4. The high temperature resistance of the laminated glass can be determined by the high temperature resistance test, using the method of ANSI/SAE Z26.1 standard Test 5.4. The humidity resistance of the laminated glass can be determined by the humidity resistance test, using the method of ECE R43 standard A7/4. The transmittance of the laminated glass can be determined by the luminous transmittance test, using the method of ANSI Z26.1 standard Test 5.2.

In an embodiment, the laminated glass is obtained by the method according to the present disclosure for preparing the laminated glass and is tested as follows: the falling ball test, the human head model test, the high temperature resistance test, the humidity resistance test and the luminous transmittance test.

In an embodiment, under the temperature of 20±5° C., the pressure of 860-1060 mbar and the relative humidity of 60±20%, the laminated glass according to the present disclosure is subjected to the falling ball test, wherein the weight of each glass plate is 471.5 g, and the area is 139.5 square inches. A steel ball with a mass of 227 g and a diameter of 38 mm is freely released from a height of 9 m and hits the laminated glass, but the steel ball fails to break down the laminated glass. Therefore, the laminated glass according to the present disclosure has high mechanical strength.

In a preferable embodiment, the laminated glass according to the present disclosure is subjected to the falling ball test by the above method, and after the impact, the total weight of the glass detached from the laminated glass is about 4.0-6.0 g. In a more preferable embodiment, the laminated glass according to the present disclosure is subjected to the falling ball test by the above method, and after the impact, the total weight of the glass detached from the laminated glass is about 4.5-5.7 g. In a particularly preferable embodiment, the laminated glass according to the present disclosure is subjected to the falling ball test by the above method, and after the impact, the total weight of the glass detached from the laminated glass is about 4.52-5.62 g. For example, about 4.0 g, about 4.1 g, about 4.3 g, about 4.5 g, about 4.52 g, about 4.6 g, about 4.62 g, about 4.7 g, about 4.8 g, about 4.84 g, about 4.87 g, about 4.9 g, about 4.84 g, about 5.0 g, about 5.06 g, about 5.1 g, about 5.18 g, about 5.2 g, about 5.3 g, about 5.37 g, about 5.4 g, about 5.5 g, about 5.6 g, about 5.62 g, about 5.7 g.

In a preferable embodiment, the laminated glass according to the present disclosure is subjected to the falling ball test by the above method, and after the impact, the area of the exposed polymer layer is 1 square inch or less.

In a preferable embodiment, the laminated glass according to the present disclosure is subjected to the falling ball test by the above method, and after the impact, the detached area between the glass plate and the polymer layer is 3 square inches or less.

In an embodiment, under the temperature of 20±5° C., the pressure of 860-1060 mbar and the relative humidity of 60±20%, the laminated glass according to the present disclosure is subjected to the human head model test. A human head model with a mass of 10 kg is released freely from the air at a height of 1.5 m and hits the laminated glass, but the laminated glass is not broken down, and no large fragments are generated. Therefore, the laminated glass according to the present disclosure has high mechanical strength and toughness.

In an embodiment, the laminated glass according to the present disclosure is immersed vertically in 66° C. hot water and kept for 3 min, then quickly taken out and immediately placed vertically in boiling hot water for heating for 2 h. No bubble, discoloration or other defect is found in the laminated glass. Therefore, the laminated glass according to the present disclosure has good high temperature resistance.

In an embodiment, the laminated glass according to the present disclosure is kept for 2 weeks in a closed space at 50±2° C. and humidity of 95±4%. No bubble, discoloration or other defect is found in the laminated glass. Therefore, the laminated glass according to the present disclosure has good humidity resistance.

In an embodiment, under room temperature, using visible light with a wavelength of 380-780 nm for a transmittance test, the transmittance of the laminated glass according to the present disclosure is about 70% or more. In a preferable embodiment, the transmittance of the laminated glass according to the present disclosure is about 76% or more. In a more preferable embodiment, the transmittance of the laminated glass according to the present disclosure is about 77% or more. For example, about 75%, about 76%, about 77%, about 78% and about 79%.

In an embodiment, the laminated glass has a thickness of about 4.5-5.5 mm. In a preferable embodiment, the laminated glass has a thickness of about 5.36 mm. For example, about 4.5 mm, 4.55 mm, about 4.6 mm, about 4.63 mm, about 4.7 mm, about 4.76 mm, about 4.8 mm, about 4.82 mm, about 4.9 mm, about 4.97 mm, about 5.0 mm, about 5.05 mm, about 5.1 mm, about 5.13 mm, about 5.2 mm, about 5.25 mm, about 5.3 mm, about 5.36 mm, about 5.4 mm, about 5.5 mm.

Process for Preparing the Laminated Glass

In another aspect, provided is a process for preparing the laminated glass according to the present disclosure, comprising the following steps:
  (1) providing a glass plate, a polymer layer and a functional device layer;
  (2) setting the glass plate, polymer layer and functional device layer, successively;
  (3) subjecting the set glass plate, polymer layer and functional device layer to lamination.

In step (2), according to the requirement of the actual product, for example, the layers of the laminated glass can be set according to the structures shown in any one of FIGS. 1-5.

In step (3), the lamination of the glass plate, polymer layer and functional device layer can be performed using the methods commonly used in the art, that is, under the conditions of high temperature and precompression (or vacuum condition) or high temperature and high pressure, through the vacuum device, the pressure is applied to the set laminated glass to make the layers in the laminated glass fit together.

In a preferable embodiment, the lamination process of step (3) is carried out in two steps, that is, two lamination operations are respectively performed on the interlayer under the same or different temperature and/or pressure.

In an embodiment, the temperature of the lamination process is about 135° C. or lower. In a preferable embodiment, the temperature of the lamination process is about 125° C. or lower. For example, about 105° C., about 110° C., about 115° C., about 120° C., about 125° C., about 130° C., about 135° C.

In a preferable embodiment, the lamination process of step (3) is carried out in two steps, wherein the lamination temperature of the first step is about 115° C. or lower, for example, about 105° C., about 110° C., about 115° C.; the lamination temperature of the second step is about 130° C. or lower, for example about 120° C., about 125° C., about 130° C.

In an embodiment, the lamination pressure of step (3) is about 13 bar or lower. In a preferable embodiment, the lamination process of step (3) is performed under vacuum condition.

In an embodiment, the lamination process of step (3) is carried out in two steps, wherein the lamination process of the first step is about 30 min, the lamination process of the second step is about 1 h.

Provided is also use of a crosslinked ethylene-vinyl acetate copolymer in the preparation of a laminated glass.

In an embodiment, the crosslinked ethylene-vinyl acetate copolymer has the following structure:

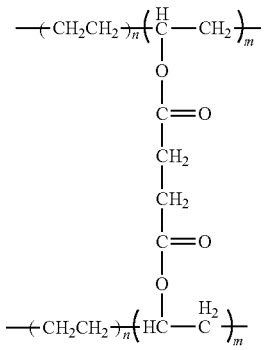

wherein, m and n are each independently an integer selected from 1-30, preferably 1-20.

In a specific embodiment, the crosslinked ethylene-vinyl acetate copolymer has a crosslinking degree of 85%.

Beneficial Effects

In the laminated glass according to the present disclosure, the crosslinked ethylene-vinyl acetate copolymer, polyolefin thermoplastic elastomer, thermoplastic polyurethane elastomer or a combination thereof is used as a polymer, forming the polymer layer of the laminated glass, as compared to the laminated glass formed from other polymeric materials such as polyvinyl butyral (PVB), it can provide an excellent mechanical property, safety performance, environmental resistance and optical property for the laminated glass. For example, the laminated glass according to the present disclosure has high mechanical strength, toughness, high temperature resistance and humidity resistance. For example, after the impact test, the total weight of the glass detached from the laminated glass according to the present disclosure is about 4.0-6.0 g, preferably about 4.5-5.7 g, more preferably about 4.52-5.62 g, and the area of the exposed polymer layer is 1 square inch or less, and the detached area between the glass plate and the polymer layer is 3 square inches or less. In addition, the transmittance of the laminated glass according to the present disclosure is about 70% or more; preferably, the transmittance of the laminated glass according to the present disclosure is preferably 76% or more; more preferably, the transmittance of the laminated glass according to the present disclosure can be up to 77% or more.

In addition, in the laminated glass according to the present disclosure, the crosslinked ethylene-vinyl acetate copolymer, polyolefin thermoplastic elastomer, thermoplastic polyurethane elastomer or a combination thereof is used as a polymer, forming the polymer layer of the laminated glass, as compared to the polymer where polyvinyl butyral (PVB) is used as the polymer layer, it does not need to use PET tape to seal the edge of the PDLC to avoid direct contact between PDLC and PVB, and thus simplifying the preparation process for the laminated glass and reducing the cost of the production.

EXAMPLES

Examples are provided below to illustrate the thermal insulation laminated glass according to the present disclosure and its preparation process without any limitation thereto.

Unless otherwise specified, the materials and instruments described herein are commercially available.

Main Reagents and Materials:

Crosslinked ethylene-vinyl acetate copolymer (EVA): purchased from Shanghai HIUV New Materials Co., Ltd.

Glass plate: purchased from Saint-Gobain, with the models of PLC and VG10+LowE.

Polymer dispersed liquid crystal: comprising two layers of polyethylene terephtalate (PET) and a liquid crystal layer, wherein PET is attached to an ITO film. It is prepared by the following procedures:

Providing the upper layer of PET, and then wiping the liquid crystal layer with 95% ethanol. Under the specified pressure, temperature and time conditions, binding the ITO film and the flexible circuit board (FPC) with anisotropic conductive adhesive film (ACF) to assemble the liquid crystal layer and the PET layer so as to obtain the polymer dispersed liquid crystal.

Main Instruments:

The transmittance of the laminated glass is determined using Perkin Elmer Lambda 950 spectrophotometer;
the transmittance test corresponds to a tungsten lamp with a color temperature of 2856.

Preparing Example

Preparing of Laminated Glass I
(1) Providing the glass plate of the laminated glass, wherein the thickness of the glass plate is 2.1 mm.
(2) Providing the crosslinked ethylene-vinyl acetate copolymer according to the size of the glass plate, wherein the thickness of the crosslinked ethylene-vinyl acetate copolymer is 0.26 mm and 0.12 mm.
(3) Providing the frame layer of the polymer according to the size of the polymer dispersed liquid crystal, wherein the thickness is 0.26 mm.
(4) Setting the laminated glass according to FIG. 7.
(5) Placing the laminated glass set as above in a vacuum device and subjecting the laminated glass to a vacuum treatment for 40 min at room temperature.
(6) Maintaining the temperature of the laminated glass at 20-110° C. for 40 min.
(7) Heating the laminated glass to 110-120° C. for 40 min.
(8) Placing the above laminated glass in autoclave, setting the conditions of the autoclave as 125-145° C. and 1.0-1.4 MPa, and subjecting the laminated glass to lamination operation to obtain the Laminated Glass I.

FIG. 7 is the structural schematic diagram of the laminated glass, which comprises two glass plates, where the two glass plates use different types of glasses respectively, that is, the glass plates of PLC and VG10+LowE, the thickness of the glass plates are both 2.1 mm. In addition, the laminated glass comprises two polymer layers, and the polymer layers each independently comprise two polymer sublayers, wherein the thicknesses of each polymer sublayers are different, which are 0.26 mm and 0.12 mm, respectively. In addition, in the functional device layer of the laminated glass, a polymer frame formed by a polymer is also included, which can surround and contain the functional module polymer dispersed liquid crystal. The thickness of the polymer frame is 0.26 mm, which is lower than the thickness of the polymer dispersed liquid crystal (0.4 mm).

Figure 6:
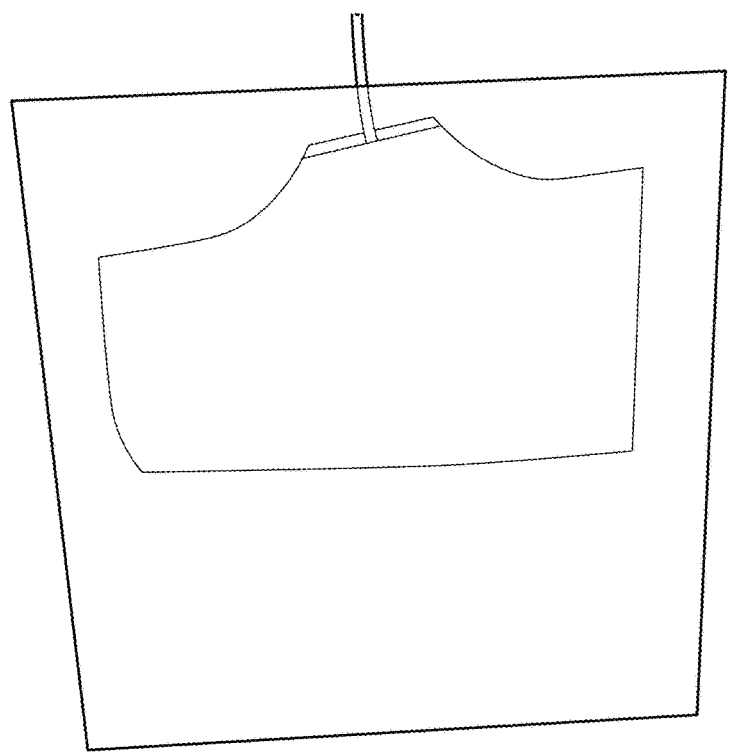
FIG. 6 shows a pictorial diagram of the laminated glass according to the present disclosure.

FIG. 6 is the pictorial diagram of the laminated glass, and its structure corresponds to FIG. 5, where the transparent part is the glass plate and the polymer layer, and the non-transparent part is the polymer dispersed liquid crystal.

Preparation of Laminated Glass II
(1) Providing the glass plate of the laminated glass, wherein the thickness of the glass plate is 2.1 mm.
(2) Providing the crosslinked ethylene-vinyl acetate copolymer according to the size of the glass plate, wherein the thickness of the crosslinked ethylene-vinyl acetate copolymer is 0.38 mm.
(4) Setting the laminated glass according to FIG. 10.
(5) Placing the laminated glass set as above in a vacuum device and subjecting the laminated glass to vacuum treatment for 40 min at room temperature.
(6) Maintaining the temperature of the laminated glass at 20-110° C. for 40 min.
(7) Heating the laminated glass to 110-120° C. for 40 min.
(8) Placing the above laminated glass in an autoclave, setting the conditions of the autoclave as 125-145° C. and 1.0-1.4 MPa, and subjecting the laminated glass to a lamination operation to obtain the Laminated Glass II.

Figure 10:
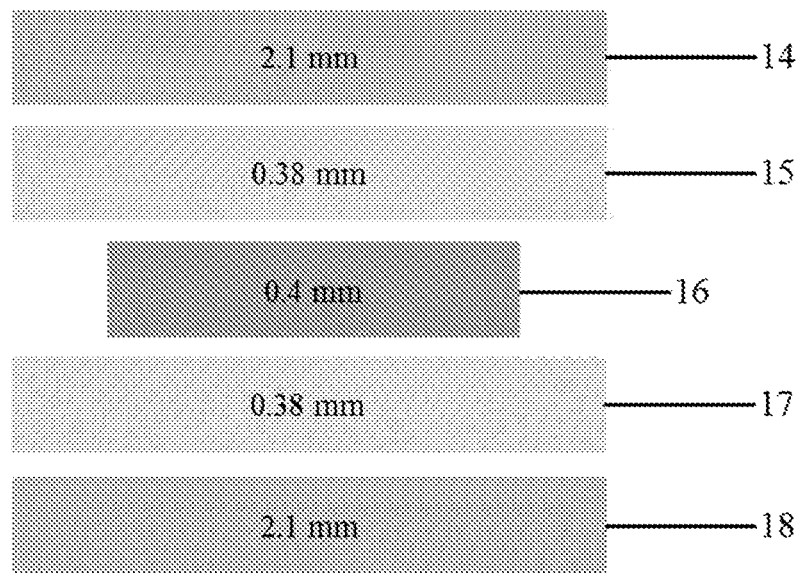
FIG. 10 shows a pictorial diagram of the laminated glass according to the present disclosure.

FIG. 10 is the structural schematic diagram of the laminated glass, which comprises two glass plates, where the two glass plates use the same type of glass, that is, the glass plate of the PLC model, and the thickness of both of the glass plates are 2.1 mm. In addition, the laminated glass comprises two polymer layers, and none of the two polymer layers comprises a polymer sublayer, and the thickness of the polymer layer is 0.38 mm. The glass plate does not comprise a polymer frame. The thickness of the functional module is 0.4 mm.

Figure 8:
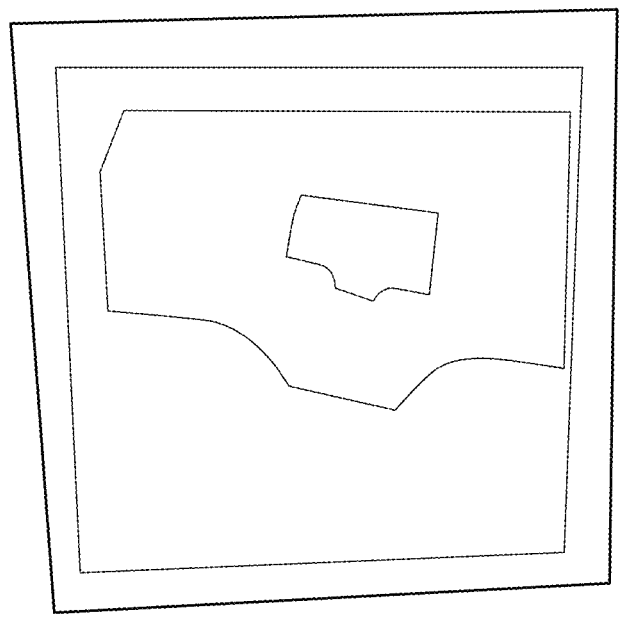
FIG. 8 shows a pictorial diagram of the laminated glass according to the present disclosure.
Figure 9:
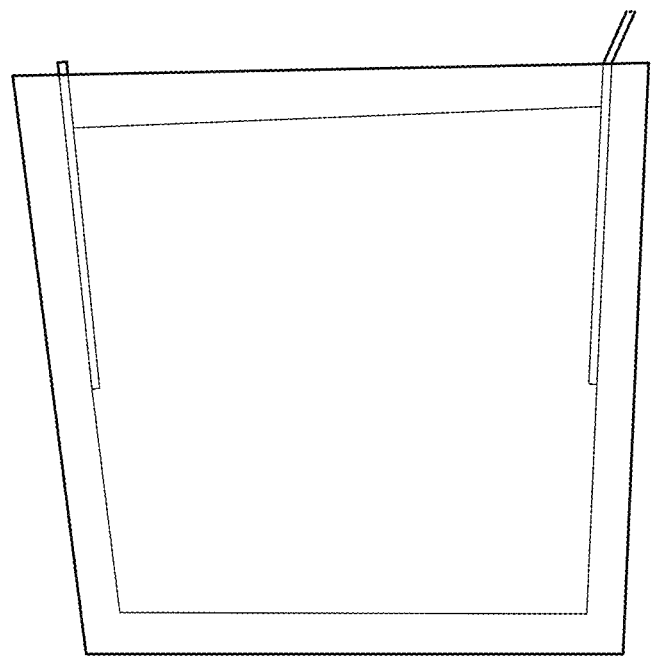
FIG. 9 shows a pictorial diagram of the laminated glass according to the present disclosure.

FIGS. 8-9 are the pictorial diagrams of the laminated glass, and its structure corresponds to FIG. 10, wherein the transparent part is the glass plate and the polymer layer, and the non-transparent part is the polymer dispersed liquid crystal.

Testing Example

By referring to the method of ECE R43 standard A7/4, the mechanical strength test is carried out on the laminated glass of the Example.

By referring to the method of ECE R43 standard A7/4, the mechanical strength and toughness test is carried out on the laminated glass of the Example.

By referring to the method of ANSI/SAE Z26.1 standard Test 5.4, the high temperature resistance test is carried out on the laminated glass of the Example.

By referring to the method of ECE R43 standard A7/4, the humidity resistance test is carried out on the laminated glass of the Example.

By referring to the method of ANSI Z26.1 standard Test 5.2, the luminous transmittance test is carried out on the laminated glass of the Example.

Mechanical Strength Test (Falling Ball Test)

Under ambient conditions of the temperature of 20±5° C., the pressure of 860-1060 mbar and the relative humidity of 60±20%, the laminated glass of the Example was placed horizontally on a frame, from a height of 9 m in the air, a steel ball with a mass of 227 g, and a diameter of 33 mm was released freely such that the steel ball hit the center of the laminated glass, and the damage degree of the laminated glass at the impact site by the steel ball was observed.

Additionally, the total weight of the detached glass from the laminated glass after impact, the area of the exposed polymer layer and the detached area between the glass plate and the polymer layer were measured.

Figure 13:
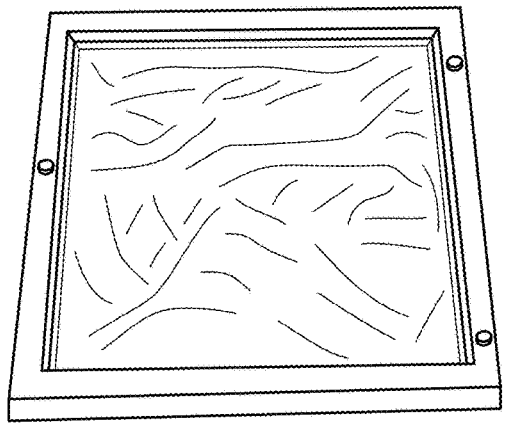
FIG. 13 shows the laminated glass according to the present disclosure after falling ball test.

12 pieces of Laminated Glass II of the Example were taken, wherein the weight of each glass plate was 471.5 g and the area of each glass plate was 139.5 square inches, and the above falling ball test was performed. After the steel ball hit the laminated glass, none of the laminated glasses was broken down. As shown in FIG. 13, after the steel ball fell and hit the laminated glass of the Example, only a crack appeared on the glass surface, and no breakdown of the laminated glass by the model was observed. Therefore, the laminated according to the present disclosure showed good mechanical strength.

After measurement, the total weight of the detached glass from the impacted laminated glass were 4.87 g, 4.62 g, 4.94 g, 4.52 g, 4.84 g, 5.06 g, 5.62 g, 4.87 g, 5.37 g, 4.94 g, 5.18 g, 5.06 g, respectively. The weight of the above-mentioned detached glass was much lower than the weight of the respective glass plate, and therefore the laminated glass plate according to the present disclosure also showed good safety performance and will not produce a large number of glass fragments after the impact.

After measurement, the area of the exposed polymer layer on the laminated glass after the impact was 1 square inch or less. Therefore, the laminated glass according to the present disclosure showed good mechanical strength, and only a small amount of glass was detached after the impact.

After measurement, the detached area between the glass plate and the polymer layer on the laminated glass after the impact was 3 square inches or less. Therefore, the laminated glass according to the present disclosure showed good mechanical strength, and only a small part of the glass plate was detached from the polymer layer after the impact.

Mechanical Strength and Toughness Test (Human Head Model Test)

Under ambient conditions of the temperature of 20±5° C., the pressure of 860-1060 mbar, and the relative humidity of 60±20%, the laminated glass of the Example was placed horizontally on a frame, from a height of 1.5 m in the air, a human head model with a mass of 10 kg was freely released such that the model hit the center of the laminated glass, and the damage degree of the laminated glass where the model hit was observed.

Figure 14:
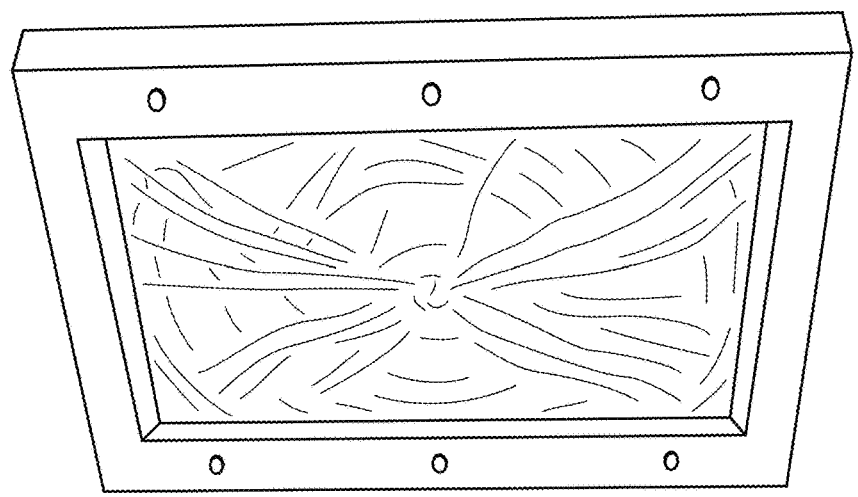
FIG. 14 shows the laminated glass according to the present disclosure after human head model.

6 pieces of Laminated Glass II of the Example were subjected to the above-mentioned human head model test. For example, as shown in FIG. 14, after the model fell and hit the laminated glass of the Example, only cracks appeared on the glass surface, no breakdown of the laminated glass by the model was observed and no large glass fragments were produced. Therefore, the laminated glass according to the present disclosure showed good mechanical strength and toughness and can effectively ensure the safety of human body when used in a vehicle window glass.

High Temperature Resistance Test

The laminated glass according to the present disclosure was immersed vertically in 66° C. hot water for 3 min, and then it was quickly taken out and immediately placed vertically in boiling hot water for 2 h. It was observed whether a bubble or discoloration, or other defect was generated in the laminated glass.

3 pieces of Laminated Glass II of the Example were subjected to the above-mentioned high temperature resistance test and no bubble was observed, and no glass discoloration nor other defect was observed. Therefore, the laminated glass according to the present disclosure showed good high temperature resistance.

Humidity Resistance Test

The laminated glass according to the present disclosure was placed in a closed space at 50±2° C. and the humidity of 95±4% and was allowed to stand for 2 weeks to observe whether a bubble or discoloration or other defects was generated in the laminated glass.

3 pieces of Laminated Glass II of the Example were subjected to the above-mentioned humidity resistance test, and no bubble was observed, and no glass discoloration nor other defect was observed. Therefore, the laminated glass according to the present disclosure showed good humidity resistance.

Luminous Transmittance Test

Under room temperature, the luminous transmittance test of the laminated glass according to the present disclosure was performed using visible light with a wavelength of 380-780 nm, such as a tungsten lamp with a color temperature of 2856.

3 pieces of Laminated Glass II of the Example were subjected to the above-mentioned luminous transmittance test and the transmittance of the laminated glasses was recorded. The transmittances of the 3 pieces of laminated glasses were 76.33%, 77.65% and 77.75%, respectively, and all of them were higher than 76%.

Although the specific embodiments of the present disclosure are described above, those skilled in the art will understand that they are provided for the purpose of illustration, and the protection scope is defined by the appended claims. Those skilled in the art without departing from the principle and essence of the present disclosure can make various changes or modifications to these embodiments and these changes and modifications fall within the protection scope of the present disclosure.

The invention claimed is:

1. A laminated glass, comprising
a glass plate,
a polymer layer, and
a functional device layer,
wherein,
the polymer layer is located between the glass plate and the functional device layer;
the laminated glass further optionally comprises another polymer layer, which is located at the other side of the functional device layer, opposite to the glass plate;
the polymer layer and the other polymer layer each independently comprise a polymer, wherein the polymer is crosslinked ethylene-vinyl acetate copolymer, which has a crosslinking degree of about 50% or more.

2. The laminated glass according to claim 1, wherein
a molar content percentage of the vinyl acetate in the crosslinked ethylene-vinyl acetate copolymer is about 5%-50%.

3. The laminated glass according to claim 1, wherein
the crosslinked ethylene-vinyl acetate copolymer has the following structure:

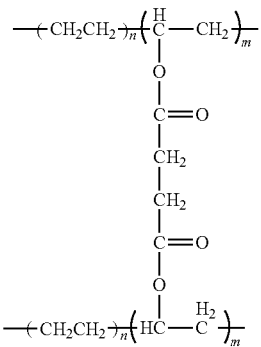

wherein, m and n are each independently an integer selected from 1-30.

4. The laminated glass according to claim 1, wherein
the functional device layer comprises a functional module selected from the group consisting of: polymer dispersed liquid crystal, suspended particle device, electrochromic display device, guest host liquid crystal display device, lighting device, wireless communication device, electronic device, sensing device, antenna, touch control module and HMI related module.

5. The laminated glass according to claim 1, wherein
the polymer layer and the optional other polymer layer each independently comprise one or more layers, and the one or more layers each independently comprise polymer.

6. The laminated glass according to claim 1, wherein
the laminated glass further comprises another glass plate, which is located at a side of the laminated glass opposite to the glass plate and is identical or different to the glass plate.

7. The laminated glass according to claim 6, wherein
the laminated glass, in the following order, comprises
the glass plate,
the polymer layer,
the functional device layer,
the other polymer layer, and
the other glass plate.

8. The laminated glass according to claim 1, wherein
an area of the functional device layer is less than that of the polymer layer, and the functional device layer further additionally comprises a polymer such that the polymer forms a continuous or discontinuous frame in the functional device layer, thereby surrounding and containing the functional module of the functional device layer.

9. The laminated glass according to claim 1, wherein
the laminated glass further comprises a polymer between the glass plate and the polymer layer, and/or between another glass plate which is located at a side of the laminated glass opposite to the glass plate and the optional other polymer layer, wherein the polymer forms a continuous or discontinuous frame, thereby surrounding and containing the functional module of the functional device layer.

10. The laminated glass according to claim 1, wherein
the laminated glass has a thickness of about 4.5-5.5 mm; and/or
the laminated glass has a transmittance of about 70% or more.

11. A process for preparing the laminated glass according to claim 1, comprising the following steps:

(1) providing a glass plate, a polymer layer and a functional device layer;
(2) setting the glass plate, polymer layer and functional device layer, successively, and
(3) subjecting the set glass plate, polymer layer and functional device layer to lamination.

12. The process according to claim 11, wherein
a lamination temperature in step (3) is about 135° C. or lower; and/or
a lamination pressure in step (3) is about 13 bar or lower.

13. A method comprising preparing a laminated glass with a crosslinked ethylene-vinyl acetate copolymer, wherein the crosslinked ethylene-vinyl acetate copolymer has a crosslinking degree of about 50% or more.

14. The laminated glass according to claim 1, wherein the polymer is completely crosslinked.

15. The laminated glass according to claim 2, wherein the molar content percentage of the vinyl acetate in the crosslinked ethylene-vinyl acetate copolymer is about 5%-40%.

16. The laminated glass according to claim 3, wherein m and n are selected from 1-20.

17. The laminated glass according to claim 4, wherein the functional module is a polymer dispersed liquid crystal.

18. The laminated glass according to claim 5, wherein the polymer layer and the optional other polymer layer each independently comprise two layers.

19. The method according to claim 13, wherein the crosslinked ethylene-vinyl acetate copolymer has the following structure:

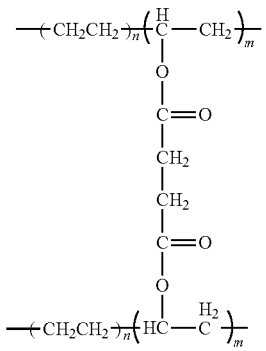

wherein, m and n are each independently an integer selected from 1-30.

* * * * *